US 9,405,474 B2

(12) United States Patent
Shukla et al.

(10) Patent No.: US 9,405,474 B2
(45) Date of Patent: Aug. 2, 2016

(54) CONFIGURABLE AND TUNABLE DATA STORE TRADEOFFS

(71) Applicant: Microsoft Technology Licensing, LLC, Redmond, WA (US)

(72) Inventors: Dharma Shukla, Sammamish, WA (US); Karthik Raman, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 655 days.

(21) Appl. No.: 13/644,129

(22) Filed: Oct. 3, 2012

(65) Prior Publication Data

US 2014/0095813 A1    Apr. 3, 2014

(51) Int. Cl.
*G06F 12/00* (2006.01)
*G06F 3/06* (2006.01)

(52) U.S. Cl.
CPC ............ *G06F 3/0611* (2013.01); *G06F 3/0617* (2013.01); *G06F 3/0659* (2013.01); *G06F 3/0673* (2013.01)

(58) Field of Classification Search
CPC .............. G06F 17/30575; G06F 3/061; G06F 17/30011; G06F 3/067; G06F 12/0246; G06F 11/1456
USPC ........... 707/636, 637, 638; 711/154, 156, 162
See application file for complete search history.

(56) References Cited

U.S. PATENT DOCUMENTS

| | | | |
|---|---|---|---|
| 7,797,141 B2 | 9/2010 | O'Connell et al. | |
| 8,417,670 B1 * | 4/2013 | Rousseau et al. | 707/638 |
| 2006/0090095 A1 * | 4/2006 | Massa et al. | 714/4 |
| 2010/0192018 A1 * | 7/2010 | Aiyer | G06F 11/28 714/37 |
| 2013/0138616 A1 * | 5/2013 | Gupta et al. | 707/690 |
| 2014/0101298 A1 * | 4/2014 | Shukla et al. | 709/223 |

OTHER PUBLICATIONS

"JavaScript Object Notation (JSON)", Retrieved at <<http://www.json.org/>>, Retrieved Date: Dec. 27, 2012, pp. 6.
Lamport, Leslie., "Paxos Made Simple", Retrieved at <<http://research.microsoft.com/en-us/um/people/lamport/pubs/paxos-simple.pdf>>, Nov. 1, 2001, pp. 14.
Lamport, et al., "Vertical Paxos and Primary Backup Replication", Retrieved at <<http://research.microsoft.com/en-us/um/people/lamport/pubs/vertical-paxos.pdf>>, In Proceedings of the 28th ACM Symposium on Principles of Distributed Computing, Aug. 26, 2009, pp. 17.
Renesse, Robbert Van., "Paxos Made Moderately Complex", Retrieved at <<http://www.cs.cornell.edu/courses/CS6452/2012sp/papers/paxos-complex.pdf>>, Mar. 25, 2011, pp. 15.

(Continued)

*Primary Examiner* — Reginald Bragdon
*Assistant Examiner* — Mehdi Namazi
(74) *Attorney, Agent, or Firm* — Aneesh Mehta; Doug Barker; Micky Minhas

(57) ABSTRACT

A data store is configurable in terms of various tradeoffs including consistency and availability, among others. Consistency can be specified in terms of one of a myriad of configuration levels. Availability can be specified with respect to a maximum and minimum number of replicas or failure tolerance. In operation, one or more of write or read quorums can be automatically adjusted to ensure satisfaction of a specified configuration level in light of changes in the number of replicas.

20 Claims, 7 Drawing Sheets

(56) References Cited

OTHER PUBLICATIONS

Mazieres, David., "Paxos Made Practical", Retrieved at <<http://www.scs.stanford.edu/~dm/home/papers/paxos.pdf>>, Retrieved Date: Dec. 27, 2012, pp. 11.

Chandra, et al., "Paxos Made Live—An Engineering Perspective", Retrieved at <<http://www.read.seas.harvard.edu/~kohler/class/08w-dsi/chandra07paxos.pdf>>, In Proceedings of the Twenty-Sixth Annual ACM Symposium on Principles of Distributed Computing, Jun. 20, 2007, pp. 16.

Oki, et al., "Viewstamped Replication: A New Primary Copy Method to Support Highly-Available Distributed Systems", Retrieved at <<http://www.cs.princeton.edu/courses/archive/fal109/cos518/papers/viewstamped.pdf>>, In Proceedings of the Seventh Annual ACM Symposium on Principles of Distributed Computing, Aug. 15, 1988, pp. 10.

Altinbuken, et al., "Commodifying Replicated State Machines with OpenReplica", Retrieved at <<http://openreplica.org/static/papers/OpenReplica.pdf>>, In Computing and Information Science Technical Reports, Jun. 5, 2012, pp. 14.

Chandra, et al., "Unreliable Failure Detectors for Reliable Distributed Systems", Retrieved at <<http://www.cs.huji.ac.il/~rds/p225-chandra.pdf>>, In Journal of the ACM, vol. 43, Issue 2, Mar. 1996, pp. 43.

Stoica, et al., "Chord: A Scalable Peer-to-Peer Lookup Service for Internet Applications", Retrieved at <<http://pdos.csail.mit.edu/papers/chord:sigcomm01/chord_sigcomm.pdf>>, In Proceedings of the Conference on Applications, Technologies, Architectures, and Protocols for Computer Communications, Aug. 27, 2001, pp. 12.

Glendenning, et al., "Scalable Consistency in Scatter", Retrieved at <<http://www.cs.washington.edu/homes/arvind/papers/scatter.pdf>>, In Proceedings of the Twenty-Third ACM Symposium on Operating Systems Principles, Oct. 23, 2011, pp. 14.

Lynch, et al., "Atomic Data Access in Distributed Hash Tables", Retrieved at <<http://groups.csail.mit.edu/tds/papers/Lynch/lncs02.pdf>>, In Revised Papers from the First International Workshop on Peer-to-Peer System, vol. 2429, Oct. 10, 2002, pp. 11.

Decandia, et al., "Dynamo—Amazon's Highly Available Key-Value Store", Retrieved at <<http://www.allthingsdistributed.com/files/amazon-dynamo-sosp2007.pdf>>, In Proceedings of Twenty-First ACM SIGOPS Symposium on Operating Systems Principles, Oct. 14, 2007, pp. 16.

Terry, et al., "Managing Update Conflicts in Bayou, A Weakly Connected Replicated Storage System", Retrieved at <<http://zoo.cs.yale.edu/classes/cs422/2011/bib/terry95managing.pdf>>, In Proceedings of the Fifteenth ACM Symposium on Operating Systems Principles, Dec. 3, 1995, pp. 12.

Bailis, et al., "Probabilistic Bounded Staleness for Practical Partial Quorums", Retrieved at <<http://vldb.org/pvldb/vol5/p776_peterbailis_vldb2012.pdf>>, In Proceedings of the VLDB Endowment, vol. 5, Issue 8, Aug. 27, 2012, pp. 12.

Vogels, Werner., "Eventual Consistent—Revisited", Retrieved at <<http://www.allthingsdistributed.com/2008/12/eventually_consistent.html>>, Dec. 22, 2008, pp. 8.

Terry, Doug., "Replicated Data Consistency Explained Through Baseball", Retrieved at <<http://research.microsoft.com/pubs/157411/ConsistencyAndBaseballReport.pdf>>, In MSR Technical Report—MSR-TR-2011-137, Oct. 2011, pp. 14.

Terry, et al., "Session Guarantees for Weakly Consistent Replicated Data", Retrieved at <<http://ieeexplore.ieee.org/stamp/stamp.jsp?tp=&arnumber=331722>>, In Proceedings of the Third International Conference on Parallel and Distributed Information Systems, Sep. 28, 1994, pp. 10.

Fischer, et al., "Impossibility of Distributed Consensus with One Faulty Process", Retrieved at <<http://www.cs.mcgill.ca/~carl/impossible.pdf>>, In Journal of the Association for Computing Machinery, vol. 32, Issue 2, Apr. 1985, pp. 9.

Gilbert, et al., "Brewer's Conjecture and Feasibility of Consistent, Available, Partition-Tolerant Web Services", Retrieved at <<http://lpd.epfl.ch/sgilbert/pubs/BrewersConjecture-SigAct.pdf>>, In Newsletter of ACM SIGACT News, vol. 33, Issue 2, Jun. 2002, pp. 12.

Cooper, et al., "PNUTS: Yahoo!'s Hosted Data Serving Platform", Retrieved at <<http://www.mpi-sws.org/~druschel/courses/ds/papers/cooper-pnuts.pdf>>, In Proceedings of the VLDB Endowment, vol. 1, Issue 2, Aug. 24, 2008, pp. 12.

Abadi, Daniel J., "Consistency Tradeoffs in Modern Distributed Database Systems Design: Cap is only Part of the Story", Retrieved at <<http://ieeexplore.ieee.org/stamp/stamp.jsp?tp=&arnumber=6127847>>, In Computer, vol. 45, Issue 2, Feb. 2012, pp. 6.

Abadi, Daniel., "Problems with CAP, and Yahoo's Little Known NoSQL System", Retrieved at <<http://dbmsmusings.blogspot.in/2010/04/problems-with-cap-and-yahoos-little.html>>, Apr. 23, 2010, pp. 12.

"MDCC: Multi-Data Center Consistency", Retrieved at <<http://mdcc.cs.berkeley.edu/>>, Retrieved Date:Dec. 27, 2012, pp. 11.

Melnik, et al., "Dremel: Interactive Analysis of Web-Scale Datasets", Retrieved at <<http://static.googleusercontent.com/external_content/untrusted_dlcp/research.google.com/en/us/pubs/archive/36632.pdf>>, In Proceedings of the VLDB Endowment, vol. 3, Issue 1, Sep. 2010, pp. 10.

Lakshman, et al., "Cassandra—A Decentralized Structured Storage System", Retrieved at <<http://www.cs.cornell.edu/projects/ladis2009/papers/lakshman-ladis2009.pdf>>, In Newsletter of ACM SIGOPS Operating Systems Review, vol. 44, Issue 2, Apr. 2010, pp. 6.

Kreps, Jay., "Project Voldemort", Retrieved at <<http://qconsf.com/dl/qcon-sanfran-2009/slides/JayKreps_ProjectVoldemortScalingSimpleStorageAtLinkedIn.pdf>>, Nov. 19, 2009, pp. 46.

"Riak", Retrieved at <<http://basho.com/technology/architecture/>>, Dec. 27, 2012, pp. 1.

Kraska, et al., "Consistency Rationing in the Cloud: Pay Only when it Matters", Retrieved at <<http://www.vldb.org/pvldb/2/vldb09-759.pdf>>, In Proceedings of the VLDB Endowment, vol. 2 Issue1, Aug. 2009, pp. 12.

Garcia-Molina, et al., "How to Assign Votes in a Distributed System", Retrieved at <<http://www.cs.purdue.edu/homes/bb/cs542-11Spr/How%20to%20assign%20Votes-JACM-garcia-molina.pdf>>, In Journal of the Association for Computing Machinery, vol. 32, Issue 4, Oct. 1985, pp. 20.

Liskov, Barbara., "From Viewstamped Replication to Byzantine Fault Tolerance", Retrieved at <<http://www.pmg.csail.mit.edu/papers/vr-to-bft.pdf>>, In Replication—Lecture Notes in Computer Science, vol. 5959, Dec. 27, 2012, pp. 29.

Hamilton, James., "Perspectives", Retrieved at <<http://perspectives.mvdirona.com/2009/11/03/OneSizeDoesNotFitAll.aspx>>, Nov. 3, 2009, pp. 7.

Hamilton, James., "Perspectives", Retrieved at <<http://perspectives.mvdirona.com/2012/01/18/AmazonDynamoDBNoSQLInTheCloud.aspx>>, Jan. 18, 2012, pp. 3.

"Quora—What is the best NoSQL database in terms of performance", Retrieved at <<http://www.quora.com/What-is-the-best-NoSQL-database-in-terms-of-performance>>, Retrieved Date: Dec. 27, 2012, pp. 3.

"NoSQL Tapes", Retrieved at <<http://nosqltapes.com/>>, Retrieved Date: Dec. 27, 2012, pp. 16.

Rhea, et al., "Churn in a DHT", Retrieved at <<http://srhea.net/papers/bamboo-usenix.pdf>>, Proceedings: In Proceedings of the USENIX Annual Technical Conference, Jun. 2004, pp. 14.

Abadi, Daniel J. "Consistency Tradeoffs in Modern Distributed Database System Design", Retrieved at <<http://ieeexplore.ieee.org/stamp/stamp.jsp?tp=&arnumber=6127847>>, Proceedings of Computer, vol. 45, Issue 2, Feb. 2012, pp. 6.

Featherston, Dietrich, "Cassandra: Principles and Application", Retrieved at <<disi.unitn.it/~montreso/ds/papers/Cassandra.pdf>>, Aug. 3, 2010, pp. 17.

Zhang, et al., "Trading Replication Consistency for Performance and Availability: an Adaptive Approach", Retrieved at <<http://ieeexplore.ieee.org/stamp/stamp.jsp?tp=&arnumber=1203520>>,

(56) References Cited

OTHER PUBLICATIONS

Proceedings of the 23rd International Conference on Distributed Computing Systems (ICDCS'03), May 19, 2003, pp. 9.

"NoCAP or, Achieving Scalability without Compromising on Consistency", Retrieved at <<www.gigaspaces.com/system/files/private/resource/NoCAPfinal0711.pdf>>, Proceedings of GigaSpaces White Paper, May 2011, pp. 10.

Bortnikov, et al., "Brief Announcement: Reconfigurable State Machine Replication from Non-Reconfigurable Building Blocks", Retrieved at <<tx.technion.ac.il/~dima39/publications/PODC127-bortnikov.pdf>>, Proceedings of ACM SIGACT-SIGOPS Symposium on Principles of Distributed Computing (PODC), Jul. 16, 2012, pp. 2.

Bailis, et al., "Probabilistically Bounded Staleness for Practical Partial Quorums", Retrieved at <<vldb.org/pvldb/vol5/p776_peterbailis_vldb2012.pdf>>, Proceedings of the VLDB Endowment, Jan. 3, 2012, pp. 12.

Chuang, et al., "Distributed Network Storage Service with Quality-of-Service Guarantees", Retrieved at <<people.ischool.berkeley.edu/~chuang/pubs/inet99.pdf>>, Proceedings of the Internet Society INET'99 Conference, Jun. 22, 1999, pp. 26.

* cited by examiner

CONFIGURABLE AND TUNABLE DATA STORE TRADEOFFS

BACKGROUND

There are tradeoffs involved with constructing data storage systems. More specifically, in the face of partitions it is possible to build a system that is either consistent or available in accordance with the CAP theorem. In other words, it is not possible to guarantee consistency, availability, and partition tolerance simultaneously. Here, consistency indicates that all data store clients see the same data at the same time, and availability means the store is available for interaction despite failures. Partition tolerance means a store can be split across processing nodes. An extension of the CAP theorem, called PACELC, adds latency to the equation. In particular, the extension states that if there is a partition (P), there is a tradeoff between availability (A) and consistency (C), else (E) in the absence of partitions there is a tradeoff between latency (L) and consistency (C).

Data storage systems are designed with the above noted tradeoffs in mind. The specific tradeoffs are often governed by the type of application. In other words, storage systems cater to particular scenarios. For example, a database employed to store and enable interaction with mission-critical enterprise data is designed for strong consistency at the expense of availability in partitioned systems. As another example, a database employed for a web application that uses a database to keep track of friend locations may be optimized for availability at the expense of consistency. Moreover, most systems are designed from scratch to support a specific configuration. Other systems allow a data store configuration to be specified and fixed at the time of provisioning of a data store.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to configurable and tunable data store tradeoffs. Various formal consistency levels are defined, including strong, consistent prefix, session, and eventual, for predicable use with any data storage system. A data storage system can be initially configured as function of replication and consistency specified in policies, for instance. The replication policy can be used to specify the write and read availability of a data store in the face of a configurable number of simultaneous failures. The consistency policy can be employed to specify a consistency level. Furthermore, availability can be specified with respect to a range of replicas, and read and write quorums can be automatically adjusted based on the current number of replicas. This at least allows a specified consistency level to be maintained without having to sacrifice availability of read and write operations despite a range of replica failures. Tradeoffs can also be indirectly specified based on the nature of data (e.g., high, medium, low value) rather than directly by way of policies, for instance. Further yet, mechanisms are provided to determine tradeoffs and monitor performance of a provisioned data store to facilitate optional reconfiguration.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
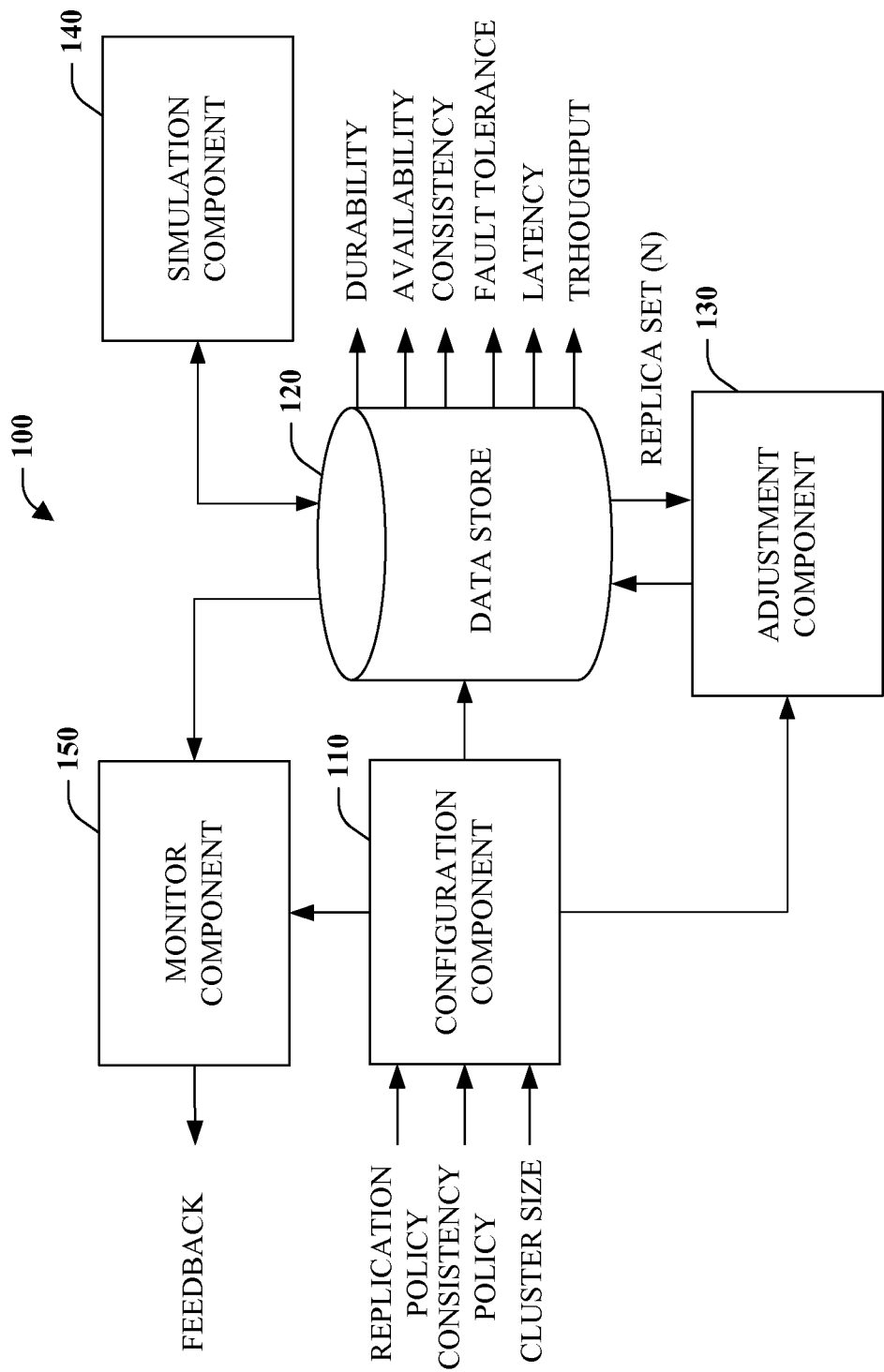
FIG. 1 is a block diagram of a data storage system.

There can be various levels of consistency. However, the specific meaning of levels of consistency varies across conventional data stores. For example, two stores implementing eventual consistency can differ as to the period of eventuality (e.g., one minute, one day, two weeks . . . ). This causes confusion and is at least a contributing factor to new data stores being developed for substantially every new application. Further, regardless of whether developed from scratch or configured, conventional stores operate in a non-quorum or static quorum system. In a non-quorum system, all replicas need to be updated with respect to an operation or the operation will fail. A static quorum system is less strict in that rather than requiring all replicas to be updated solely a quorum is needed thereby providing a performance boost. Nevertheless, static quorum systems are configured for a fixed number of simultaneous failures. If the system exceeds the number of failures, the system will be unavailable. If the system has less than the number of failures, a higher level of consistency may be provided. While it may seem beneficial to get a higher level of consistency such as strong consistency rather than eventual consistency, it can be detrimental since applications are designed to work with a single level of consistency.

Details below are generally directed toward configurable and tunable data store tradeoffs including availability and consistency, among others. More specifically, formal definitions are provided for various levels of consistency for data stores or data storage systems. A replication policy as well as a consistency policy, including a consistency level, can be specified when configuring a data store. Furthermore, read and write quorums can be dynamically adjusted to ensure continuous availability at a selected consistency level for a range of failures. As the number of replicas change dynamically based on failures, the read and write quorums are tuned automatically and continuously. Further, nature of the data (e.g., high, medium, low value) can be utilized to drive configuration indirectly rather than directly through policies or controls that are more granular. To aid reconfiguration of data store characteristics, simulation and monitoring mechanisms are provided. Simulated data can be employed to determine the state of the system in the background in terms of tradeoffs and initiate automatic reconfiguration, if needed. Additionally, the state of the system based on user data can be monitored and fed back to an administrator, for example, who may reconfigure the store if desired.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, data storage system 100 is illustrated. In accordance with one embodiment, the data storage system is a document-oriented storage system implemented as a distributed web or cloud service. Of course, aspects of the disclosed subject matter are not intended to be limited to document-oriented stores or distributed systems or services absent explicit language to the contrary. In fact, aspects are applicable to any relational (e.g., SQL) or non-relational (e.g., NoSQL) data store. Further, there is more particular applicability to purpose built stores, which are stores built for a specific purpose, access pattern, or workload, for example.

The data storage system 100 includes configuration component 110 that enables initial configuration of the data store 120 for a particular use. The configuration component 110 can receive, retrieve, or otherwise obtain or acquire a replication policy, a consistency policy, and a cluster size specified by an application developer, for instance. The replication policy (a.k.a. availability policy) specifies the availability of the data store over a range of failures. The consistency policy specifies at least a consistency level. The cluster size (a.k.a. scale factor) is indicative of the number of physical or virtual machines for use with respect to partitioning data store 120.

The data store 120, or an instance thereof, can be provisioned, or constructed, as a function of the inputs to the configuration component 110. The data store 120 that results has various properties including durability, availability, consistency, fault tolerance, latency, and throughput. Accordingly, various configurations can result in initial configuration of different data stores. Additionally, it is to be appreciated that although illustrated as a single data store for simplicity, the data store 120 can be arbitrarily simple or complex based on the how it is configured. Moreover, adjustment component 130 can be configured to automatically and continuously adjust, or tune, the data store 120 dynamically at runtime. By way of example, and not limitation, adjustments can be made to the data store 120 to maintain continuous availability at a configured consistency level across a range of failures automatically without human intervention and without sacrificing other properties of the store such as, but not limited to, durability.

In accordance with one embodiment, a logical partition can be used as a unit of redundancy and availability. Data within each logical partition is replicated for availability and reliability. Multiple copies of data corresponding to each logical partition can exist across compute nodes inside a cluster, and the multiple copies are maintained by virtue of the process of replication. The number of copies and the mechanisms of replicating the data of each partition can be governed by policies configurable by a developer at the time of provisioning an instance of a data store 120.

The data store 120 can provide the illusion of a single partition to a client. Internally, however, multiple copies of the state of a partition can be maintained across physical nodes to ensure the state is not lost in the face of failures. Clients can perform read and write requests against a partition, which is served by a replica. Multiple replicas, each serving operations from clients and managing its own local copy of the state of the logical partition, collectively implement a distributed, deterministic state machine. The replicated state machine is collectively implemented by a set of replicas, which constitutes the replica set of a logical partition.

There are at least three approaches to implement a replicated state machine protocol. First, write requests can be set to all replicas simultaneously, and the replicas agree on the ordering of operations based on an agreement protocol. Second, write requests can be set to an agreed upon/distinguished location called the primary. This is called single master or primary copy replication. Here, the primary propagates operations to other replicas, called secondaries, either synchronously, if the primary waits for propagation to safely commit on the secondaries before completing a client request or asynchronously, if the primary eagerly completes the client request without waiting on the outcome of replication. Regardless of synchronous or asynchronous modes, a primary can choose to wait for the acknowledgement of from all secondaries or a quorum of secondaries before considering replication successful. The third approach is the write requests are sent to an arbitrary location first. This approach allows for greater degree of write availability at the cost of complexity and depending on the implementation, a potential loss of consistency.

For the sake of brevity and clarity, discussion herein focuses on use of the second approach. However, the scope of the invention is not intended to be limited in scope to this approach. Regardless of implementation, the replicated state machine protocol is designed so that a client perceives to send both read and write operations to a single logical entity. The client remains oblivious to the replica failures, primary/master election, load balancing of replicas and other such concerns pertaining to replication and distribution.

In accordance with one embodiment, there exists a distinguished replica for a given logical partition, called the primary, which is replica capable of receiving and processing write requests (e.g., POST, PUT, PATCH, DELETE) which can create or mutate a resource from a client's perspective. Other replicas in the group are referred to as secondaries. The primary can perform operational replication in that it replicates each write operation issued by a client to other cohorts in the replica set. The primary performs both synchronous as well as asynchronous replication depending on the configuration and desired consistency level and uses a quorum based protocol for both write and read operations. Despite failures, a primary will exist for a given logical partition. Moreover, the primary coordinates replication of a client's write operations to secondaries. The state machine protocol can include both forward progress as well as catch-up of a replica, which could be lagging behind due to network conditions, previously failed, or newly introduced. Read requests from a client (e.g., GET, HEAD . . . ) can go to any replica inside a replica set. More specifically, a read request can go to any of a plurality of secondaries or the primary rather than merely targeting the primary.

While state machine replication provides the illusion of a logical entity for clients in the face of failures, intrinsic are tradeoffs around data availability, consistency, latency, and fault tolerance. Data availability is a complex function of individual node availability, the replication model, rate and distribution of correlated node failures, replica placement, and replica recovery times. Likewise, data consistency is a complex function of the guarantees provided by the replication mode and the exact model and mechanism of implementing write and read quorums. Latency is also a complex function of the mechanics of replication and the consistency model. Fault tolerance is dependent at least on the cluster size and replica set.

The replication policy (a.k.a. availability policy) allows specification of a replica set. Since nodes can join or leave in the face of failures or administrative operations (e.g., updates, upgrades), the replica set is a dynamic entity. In other words, the membership of a replica set can change over time. The number of replicas constituting the replica set at a given point in time is denoted "N."

At the time of provisioning a new instance of a data store, the administrator can set the maximum replica set size, "$N_{max}$," of the replica set by way of the replication policy. For a given partition, the value of "N" in steady state would be equal to "$N_{Max}$." During periods when or more replicas are down, the value of "N" would be less than "$N_{Max}$." Failed replicas can be brought back automatically and the value of "N" will climb back to "NMax."

The choice of the value of "$N_{Max}$" is significant in deciding tradeoffs between availability, write latency, compute and bandwidth costs, and throughput. A higher value of "$N_{Max}$" implies higher fault tolerance and availability (write and read), data durability, and better read throughput. Choice of a large value of "$N_{Max}$" ensures that the data store can cope with a large number of simultaneous failures without losing availability and maintaining durability. However, the large value of "$N_{Max}$" comes at a cost of high write latency (e.g., due to higher value of write quorum) and an increase in storage, compute, and bandwidth costs. The rationale behind selecting a larger value of "$N_{Max}$" is the insurance for remaining available in the event of failures. The subject system allows developers to tradeoff high latency and storage cost in steady state to remain available in periods when the store is struck by simultaneous failures. Although not limited thereto, in general "$N_{Max}$" can be configured based on the following rule:
$N_{Max}=2f+1$, for odd values of $N_{Max}$, and,
$N_{Max}=2f$, for even values of $N_{Max}$.
Here, "f" is the number of simultaneous failures that are desired to be tolerated when "$N=N_{Max}$".

The lower bound on membership size of a replica set is called minimum replica set size and is denoted by "$N_{Min}$." It represents the lower bound on the durability and availability of write operations of the partition and thus the store as a whole. If "N" reaches a value less than "$N_{Min}$," the writes are blocked on the primary and the partition is considered unavailable for writes. The writes remain blocked until one or more of the failed replicas can recover and rejoin the replica set such that the replica set is restored to at least "$N_{Min}$." The value of "N" can fluctuate between the extremes "$N_{Max}$" and "$N_{Min}$," depending on the mean time to failure (MTTF). The rate at which the store reaches from "$N_{Max}$" to "$N_{Min}$" depends on the rate and number of failures versus the regeneration time for the failed replicas (e.g., MTTF (Mean Time To Failure) versus MTTR (Mean Time To Regeneration)).

In a Read-One-Write-All (ROWA) based replication model, the primary considers a client's write request successful only after it has durably committed to all of the replicas in the replica set. In contrast, in a quorum based replication model, the primary considers the write operation successful if it is durably committed by a subset called the write quorum (W) of replicas. Similarly, for a read operation, the client contacts the subset of replicas, called the read quorum (R) to determine the correct version of the resource; the exact size of read quorum depends on the consistency policy.

The fact that not all the replicas have to be contacted for writes or reads provides a significant performance boost. Further, a masking quorum based replication schemes, such described herein, provide data availability at the expected consistency level in the face of simultaneous and/or successive failures. Moreover, the masking scheme provided herein is dynamic in nature. Depending on rate of failures and the regeneration of failed replicas, the membership of the replica set is in flux. Since the write and read quorum values are calculated based the current size of the replica set and consistency level, these are both dynamic as well.

A quorum of replicas required to acknowledge a write replication operation before the request is acknowledged to the client by the primary is called the write quorum, denoted "W." The write quorum thus acts as a synchronization barrier for the writes to become visible to the clients. Note that for efficiency, the primary may batch multiple write operations together into a single replication payload and propagate to the secondaries.

The write quorum used in the replication model as employed by the subject system can be a majority quorum. That is, the value of the write quorum is dynamically calculated as follows:

$W=Ceiling((N+1)/2)$

Note that since the replica set "N" is dynamic and can range between "$N_{Max}$" and $N_{Min}$," the write quorum can be calculated dynamically and can range anywhere between $W_{Max}=Ceiling(N_{Max}+1)/2)$" and $W_{Min}=Ceiling(N_{Min}+1)/2)$" at any point in time. The following table illustrates a set of values of write quorum based on the value of the number of replicas within a replica set at a given point in time.

TABLE 1

| Replica set (N) | Write quorum (W) |
| --- | --- |
| 1 | 1 |
| 2 | 2 |
| 3 | 2 |
| 4 | 3 |
| 5 | 3 |
| 6 | 4 |
| 7 | 4 |
| 8 | 5 |
| 9 | 5 |

In a static quorum based system where the value of "W" is fixed, once the number of replicas in a replica set reaches a point where "W" cannot be satisfied, the system becomes unavailable. The value of "W" in a static quorum based system thus acts as a digital switch for the availability. The moment the value of "N" falls below "W," the system becomes unavailable. By contrast, here, the write quorum can be continuously self-adjusted dynamically corresponding to changes in membership (N) of the replica set. The value of "W" is adjusted dynamically corresponding to the value of "N" at any point in time. The self-adjusting model of dynamically calculating the write quorum enables a wider range of continued availability of the service while maintaining the desired level of consistency.

Note that "W<=1" implies asynchronous replication. Since the vote of the primary is sufficient for write to be considered successful, the client request need not be blocked for the replication (and write operation) to be considered successful. By contrast, "W>1" implies synchronous replication. Since more than the primary's vote is required for the write to be considered successful, the client request is blocked until the primary receives acknowledgement from "W−1" secondaries.

The dynamic, majority based write quorum is advantageous for providing both write availability without necessarily having to trade off support for a specified level of consistency. The adjustment component 130 is configured to automatically adjust the write quorum in the face of failures (changing values of "N") until the write quorum reaches the "$W_{Min}$" corresponding to "$N=N_{Min}$." This is the point at which the partition can subsequently become unavailable for writes.

Write quorum is the measure of a partition's availability for write operations. As long as the write quorum can be ensured, the write availability is ensured. The necessary condition for write quorum at any given point in time is the following "W=f+1." That is, at any time, in order to maintain write availability in the face of "f" simultaneous failures, the value of "W" should be "f+1." For instance, if "W=2," the partition can withstand one failure. If "W=3" the partition can withstand two failures, and so on. The write quorum corresponding to "$N_{Min}$" is "$W_{Min}=f_{min}+1$." That is the minimum value of write quorum that can tolerate "$f_{Min}$" simultaneous failures before rending the service unavailable for writes. A typical value for "$f_{Min}$" is one to ensure basic durability guarantees. Hence, a typical value of "$W_{Min}$" to ensure both write availability and durability is two. If the value of "W" is less than two, the partition can lose data if there are any additional failures. In Table 1 above, the corresponding value of "$N_{Min}$" is two. For low value, cached, read only data, the lowest possible value of "$W_{Min}$" could be one while still ensuring read availability is one. At this point "$f_{Min}=0$" and the system can lose data with even a single failure.

The quorum of replicas, denoted "R," specifies the number or replicas that are required to be contacted to get the latest value of a resource for a given consistency level. Contacting the primary should be avoided except for particular circumstances. Just like the write quorum, the read quorum is also calculated dynamically based on a desired consistency level and the value of the write quorum and the replica set at a given point in time.

Latency of read operations is influenced by the value of "R." In general, the larger the value of "R," the longer it will take to complete a client read operation request. This also affects the throughput of read operations.

Similar to the write quorum, the value of the read quorum at any time can range between lower and upper bounds, which in this case are influenced by the desired consistency level specified by a developer at a cluster level. "R=1" is typical for eventually consistent reads and "R=N+1−W" for strongly consistent reads. Thus, the read and write quorums overlap. The following table illustrates various values of "R" corresponding to different values of "N" and "W" and consistency levels as will be described further hereinafter.

TABLE 2

| Replica Set (N) | Write Quorum (W) | Read Quorum (R) for Strong Consistency | Read Quorum (R) for Consistent Prefix and Session Consistency | Read Quorum (R) for Eventual Consistency |
|---|---|---|---|---|
| 1 | 1 | 1 | 1 | 1 |
| 2 | 2 | 1 | 1 | 1 |
| 3 | 2 | 2 | 1 | 1 |
| 4 | 3 | 2 | 1 | 1 |
| 5 | 3 | 3 | 2 | 1 |
| 6 | 4 | 3 | 2 | 1 |
| 7 | 4 | 4 | 3 | 1 |

As mentioned, at the time of provisioning an instance of a data store, a developer can configure a replication policy. The replication policy describes read and write availability of the store in the face of configurable number of simultaneous failures. Read and write availability can by defined by specifying either "NMax" and "NMin" or the number of simultaneous failures the system can tolerate for reads and writes respectively. That is "$N_{max}$-$N_{Min}$" for reads and writes respectively. Based on the value of "N" at any given time, the write quorum and the read quorum can be dynamically computed by the adjustment component 130.

The following is an exemplary class definition for a replication policy:

```
public sealed class ReplicationPolicy {
    public ReplicationPolicy(int minReplicaSetSize = 2, int maxReplicaSetSize = 3);
    public int MinReplicaSetSize { get; }
    public int MaxReplicaSetSize { get; }
    public int IsSynchronous { get; } }
}
```

This policy describes read and write availability in light of a configurable number of simultaneous failures defined by specifying "$N_{Max}$" and "$N_{Min}$." Further, note that replication can be either synchronous or asynchronous. Replication is synchronous if the primary waits for propagation to commit safely on the secondaries before completing a client request. Alternatively, replication is asynchronous or if the primary eagerly completes the client request without waiting on the outcome of replication.

Many disciplines of computer science including distributed systems, hardware, operating systems/runtimes, databases, and user groupware have each had rich formalisms for the consistency models and what data consistency means in the specific context. As an example, hardware engineers have defined memory models and cache coherence protocols with formal definitions of consistency levels. Although very similar on the surface, consistency levels differ in nuances and semantics from the ones that distributed systems engineers have defined for various distributed systems.

Conventional distributed storage systems lack a formal framework for reasoning about consistency. As examples, strong consistency means different things to different stores, and developers are forced to try to determine how eventual eventual consistency is in a particular store.

Further, each conventional storage system has defined its own nomenclature and interpretation of the consistency that it provides. Consequently, application developers are forced to understand specific nuances of consistency that a storage system provides. Worse yet, developers are forced to rationalize the nuanced semantics of data consistency exposed by two stores with the same names (e.g., eventual) but implying a different level of guarantees (e.g., read your writes consistency vs. consistent prefix).

To address this problem, formal definitions of consistency are provided. Although not limited thereto, four consistency levels and be utilized in decreasing order of consistency: strong, consistent prefix, session, and eventual. Developers can chose one of these four consistency levels as the consistency level for all read operations at the time of provisioning a store, for example. Alternatively, these levels can be specified on a per request basis.

Strong consistency is defined in terms of sequential or "one copy serializability" specification. Strong consistency guarantees that a write is only visible after it is committed durably by the write quorum of replicas. The conditions for strong consistency are thus: "W+R>N" and "W>N/2."

The first condition ensures that the read and write quorums overlap. Any read quorum therefor is guaranteed to have the current version of the data. During network partitions, this condition also ensures that an item cannot be read in one partition and written in another—thus eliminating read-write conflicts.

The second condition ensures that the write quorum is the majority quorum. As previously noted, this can indeed be the case regardless of the consistency level. Further, given use of dynamic majority-based write quorums, the condition for strong consistency is: "R>N-$_{Ceiling}$((N+1)/2)."

Consistent prefix, session, and eventual consistency are three shades of weak consistency. The condition for these three forms of consistency is thus: "R+W<=N." For use of dynamic quorums, the condition for the weaker forms of consistency is: "R<=N-$_{Ceiling}$((N+1)/2)."

Consistent prefix consistency allows reads to lag behind the writes (generally speaking with a bounded staleness), but clients are guaranteed to see the fresher values over time. Consistent prefix guarantees that clients can assume total order of propagation of updates without any gaps. By way of example, and not limitation, consider a thirty-millisecond delay in reads. In this case, reads are stale, but will not go back in time. Accordingly, if a value five was written at time one and then value six was written at time two, a read will acquire five and later six but not six and then five. Consistent prefix reads can be configured as "W+R<=N."

Unlike the global consistency models offered by strong and consistent prefix, session level consistency is tailored for a specific client session. Session level consistency is usually sufficient since it provides all of the four guarantees that a client can expect. By default, configuring a store with consistency level equal to session automatically enables four well-known flavors of session consistency, namely read your writes, monotonic reads, writes follow read, and monotonic writes. Session level consistency can be configured as "R+W<=N," where "W>=R."

Eventual consistency is a global consistency level and it is the weakest form of consistency, wherein a client may get values that are older than ones previously acquired. In the previous example, a client might see six before five, five before six, or five for a period of time and then six. Eventual level consistency can be configured as "W+R<=N," with a typical value of "R=1." Any value of "R" greater than one is unnecessary since reading from any single replica would satisfy eventual consistency guarantees.

The following table captures the conditions for the four levels of consistency.

TABLE 3

| Consistency Level | Condition(s) |
| --- | --- |
| Strong | R + W > N |
| Consistent Prefix | R + W <= N |
| Session | R + W <= N and W >= R |
| Eventual | R + W <= N and R = 1 |

Staleness is a measure of anti-entropy propagation lag. Staleness can be described either in terms of a time interval or in terms of a number of write operations by which the secondaries are lagging behind the primary. When the consistency level is set to eventual, in theory the staleness of the system does not have any guaranteed upper bound. In practice though, most of the time a data store configured with consistency level of eventual provides up-to-date reads. In contrast, when the consistency level is set to strong, the staleness is said to be zero. When the level is set to consistent prefix, the staleness can be bounded between the extreme of strong and eventual, and can be configured by a developer at the cluster level.

The consistency policy describes the desired consistency level for read operations as well as bounded staleness. The following is an exemplary class definition for consistency level:

```
public enum ConsistencyLevel { Strong, ConsistentPrefix, Session, Eventual
}
public sealed class BoundedStaleness {
    public int MaxPrefix { get; set; }
    public int MaxTimeIntervalInSeconds { get; set; }
}
public sealed class ConsistencyPolicy {
    public ConsistencyLevel DefaultConsistencyLevel { get; set; }
    public BoundedStaleness BoundedStaleness { get; }
}
```

As long as the write quorum is maintained, the write availability is guaranteed. The number of simultaneous failures that the replica set can tolerate can be calculated as "f=N-$R_o$," where "$R_o$" is (the value of an internally maintained read quorum and is) defined as, "$R_o$=$_{Floor}$((N+1)/2)."

The following table illustrates the number of simultaneous failures that the system can tolerate, its fault tolerance, corresponding to various values of "N" and "$R_o$." The table also shows the corresponding values of "W."

TABLE 4

| Replica Set Size (N) | Majority Write Quorum (W) | Majority Read Quorum ($R_0$) | Number of simultaneous failures that are tolerated f = N - $R_0$ |
| --- | --- | --- | --- |
| 1 | 1 | 1 | 0 |
| 2 | 2 | 1 | 1 |
| 3 | 2 | 2 | 1 |
| 4 | 3 | 2 | 2 |
| 5 | 3 | 3 | 2 |
| 6 | 4 | 3 | 3 |
| 7 | 4 | 4 | 3 |
| 8 | 5 | 4 | 4 |
| 9 | 5 | 5 | 4 |

As seen from Table 4, for a given replica set configuration, the value of "W" holds until a set of simultaneous or successive failures occur causing the value of "N" to drop and eventually become equal to "$R_o$." At that point, the value of "W" can be re-adjusted as the majority quorum of the current value of "N."

In the worst case, assuming that the MTTF remains significantly less than MTTR, "W" and "N" both which drop below their minimum values and the system can become unavailable until one or more replicas can recover. The write quorum can be adjusted again in synchronization with the growing replica set size.

When the number of simultaneous failures exceed "$N-R_o$," the quorum is considered to be lost. The situation with quorum loss is identical to that when the value of "N" reaches "$N_{Min}$." At this point, the system waits for a configurable amount of time for one or more failed replicas to recover. If the replicas fail to recover during that period, new replicas can automatically be created and introduced to the replica set. Subsequently, new replicas catch-up from the cohorts and build their state.

Dynamic quorums are more resilient to faults both simultaneous as well as, successive compared to their static quorum counterparts. An asynchronous consensus algorithm with static quorum can tolerate "$f=(N-1)/2$" simultaneous fail stop faults. To appreciate the failure model associated with the static quorums, consider a replica set of size "$N=5$" and static write quorum "$W=3$." The number of simultaneous failures the system can tolerate is two. After two simultaneous failures, the value of "N" has reached three. At this point, any additional failures will force the write quorum to go below three to two, causing the service to become unavailable. Notice that even though there are three full replicas alive, which can tolerate one additional failure, the system has become unavailable because the write quorum was statically configured to be three.

Contrast this with a dynamic quorum based system. For "$N_{Max}=5$" and "$N_{Min}=2$," in steady state "$N=N_{Max}=5$." Two simultaneous failures would lead to "$N=3$" and "$W=2$." Notice the value of "W" has been lowered to be the majority of the current replica set. In fact, the system is capable of tolerating up to three total failures before reaching "$W_{Min}$" and subsequently becoming unavailable for writes. In general, the dynamic majority based quorum allows for tolerating "$N-N_{Min}$" numbers of successive failures.

The durability of the write operations is subject to the value of write quorum (W). As long as the write quorum is maintained at a value greater than the number of simultaneous failures, the write operation is will survive and the system avoids any data loss within the cluster. The minimum value of "W" to tolerate a minimum number of "f" simultaneous failures is "$W_{Min}=f_{Min}+1$."

Note that while running on commodity hardware where data center outages/disasters are always an unfortunate possibility, intra-cluster durability is not sufficient. To that end, "W>f," is not sufficient for avoiding data center outages. To cope with data center disasters, an incremental backup of the data inside logical partitions can be performed in the background.

Further, a developer can selectively mark collections of data as sealed, indicating the collection is read-only from that point onwards. Sealed collections can be configured to be erasure coded to improve the durability and fault tolerance (for a comparable storage cost of required in case of full replication), along with significant savings in storage cost but at the cost of reduction in read performance.

The configurable consistency model applies to the replicated state machine comprising a group of replicas. This forms a global or distributed view of data consistency across a set of replicas. At each replica site, the local view of data consistency across a set of read and write operations can be atomic, strongly consistent, isolates individual operations from side effects, and is durable. In other words, the replica is ACID compliant.

In accordance with the CAP theorem, a decision has to be made between reducing consistency (C) or availability (A) when there is a network partition (P). In other words, the CAP theorem forces storage system designers to answer the following question: "If there is a partition, does the system give up availability or consistency?"

Based on the CAP theorem, there are three types of distributed systems:
AP—Always available and partition tolerant but inconsistent;
CP—Consistent and partition tolerant but unavailable during partitions; and
CA—Consistent and available but not tolerant of partition.

In practice, "A" and "C" are asymmetrical and thus reducing the three types into essentially two: CP/CA and AP. Stated differently, it is possible to build a system that is consistent and in the face of partitions or available, but not both. Note the CAP theorem imposes no restriction in the baseline and steady state of the system where there are no network partitions. In the absence of network partitions, the system can continue to provide both strong and sequential consistency without making any compromises.

The CAP theory, however, does not capture latency. Depending on the system, stronger levels of consistency usually come at the cost of higher latencies.

A variant of CAP, called PACELC, adds that in absence of a partition, a decision has to be made between reducing latency or consistency. More specifically, PACELC states that if there is a partition (P) the system has to make a tradeoff between availability (A) and consistency (C) else (E) in the absence of network partitions the system has to tradeoff between latency (L) and consistency (C). Typically, systems that tend to give up consistency for availability when there is a partition also tend to give up consistency for latency when there is no partition. The exact tradeoffs are dependent on a specific application workload in terms of its requirement for availability, latency, and consistency. However, instead of baking these tradeoffs into a storage system, a storage system can be configured to make correct tradeoffs. This can be done by configuring the availability and consistency policies.

The tradeoff between consistency and latency pointed out by PACELC is applicable to the subject storage system. However, unlike static quorum based systems where higher levels of consistency correspond to higher read and write latencies, by using a dynamic quorum based approach, there is a strong correlation between consistency and read latency but not write latency. More specifically, the "L" in PACELC corresponds to read operations only. The latency of write operations remains the same regardless of the level of consistency. The "ELC" part of PACELC also assumes that latency and availability are strongly correlated. However, this is based on a static quorum based system, as is discussed further below. Use of a dynamic write and read quorums avoids the strong correlation of latency and availability as well as consistency and availability.

Latency of write operations directly correspond to higher values of "W." Stated differently, the higher the value of "W," the worse the write latency gets. Note also that the dynamic nature of the write quorum implies that for a given consistency level, the write latencies fluctuate based on the value of "N." Due to the use of dynamic write quorums, the latency of the write operations is closely related to the value of "N" at a given point of time, and is largely independent of the consistency level. As shown in Table 3, higher values of "N" imply higher values of "W." In a steady state when "N=$N_{Max}$," higher values of "$N_{Max}$" will correspond to a higher value of "W" and vice versa. During failures when "N<$N_{Max}$," or for low values of "$N_{Max}$," "W" is adjusted and is relatively of a lower value. This implies that so long as "N" is smaller (either in steady state or amidst failures), "W" is smaller leading to better write latencies.

Latency of read operations directly corresponds to higher values of "R." In other words, the higher the value of "R," the worse the read latency gets. The dynamic nature of read quorum implies that that for a given consistency level, the read latencies fluctuate based on the value of "N." Due to the use of dynamic read quorums, the latency of the read operations is closely related to the value of "N" at a given point in time, as well as the consistency level. This is different from the relationship of write latency and consistency level in which write latencies where independent of the consistency level.

The condition for strong consistency is "R>N-$_{Ceiling}$((N+1)/2)." Thus, strongly consistent read for higher values of "N" necessitate higher values of "R" resulting in higher read latencies. Conversely, for weaker forms of consistency, a relatively low value of "R" (e.g., one or two) is sufficient resulting in lower read latency. This results because the condition for weaker forms of consistency is "R<=N-$_{Ceiling}$((N+1)/2)." These observations are also evident from Table 3 for various values of "N," "W," and "R."

In most storage systems with statically configured write quorum, strong consistency implies higher (fixed) value of "W" relative to "N." The availability of write operations degrades if the quorum cannot be satisfied due to replica failures. Such systems tend to give up consistency (so they can use a smaller W) or write availability in the face of failures.

By contrast, use of dynamic and majority based write quorums results in the value of "W" being constantly adjusted depending on the current replica set size "N." This ensures that the availability of write operations is not compromised despite the replica failures (until the replica set reaches "$N_{Min}$"). The dynamic and self-tuning of write quorums allows for maintaining the desired consistency guarantees without having to sacrifice the write availability as long as "N" remains between "$N_{Max}$" and "$N_{Min}$".

Again, use of dynamic and majority based read quorums results in the value of "R" being constantly adjusted depending on the current replica set size "N," the current write quorum "W," and the desired consistency level (which ultimately decides if "R>N-W" or "R<=N-W"). This ensures that the availability of read operations is not compromised despite replica failures (until the replica set reduces to a single replica). The dynamic and self-tuning of read quorums allows for maintain the desired consistency guarantees without having to sacrifice read availability for as long as a single replica remains alive.

In static quorum bases systems that use a fixed value of "W," the write availability and latencies are directly correlated. Higher values of "W" correspond to deterioration in write availability and latency. This is because the primary has to wait until a fixed number of "W–1" replicas can respond before sending the response to the client. The availability of the write operation suffers if any of the replicas among the quorum of "W–1" replicas are slow to respond or if the quorum cannot be satisfied due to failures. Stated differently, a high latency would imply unavailability of the system.

In a dynamic quorum based approach, however, the value of "W" is automatically self-adjusted based on the current replica set. Hence, the availability of write operations is not gated by the current value of "W" but the latency is gated by the current value of "W." The availability of write operations is gated by the fact that the write quorum needs to be met. Thus, in order to be available for writes, the replica set "N" should be between "$N_{Min}$" and "$N_{Max}$."

Again, in static quorum based systems that use a fixed value of "R," the read availability and latencies are directly correlated. Higher values of "R" correspond to deterioration in read availability and latency. This is because for the read operation to be successful, the client needs to wait until a fixed number of "R" replicas respond (where "R>N-W" or "R<=N-W," depending on the level of consistency expected by the client). The availability of the read operation suffers if any of the replicas among the quorum of "R" replicas are slow to respond or if the quorum cannot be satisfied due to failures. Stated differently, a high latency implies unavailability of the system.

However, in the dynamic quorum based approach, the value of "R" is automatically self-adjusted based on the current replica set, write quorum, and the consistency level. Hence, the availability of a read operation is not gated by the current value of "R" as is the case with latency.

Although the configuration component 110 is illustrated as accepting availability and consistency policies, the subject invention is no so limited. For example, the configuration component can accept direct specification of initial values of "N," "W," "R," and consistency level directly. As dynamic values, they can subsequently be adjusted in response to changes at runtime by the adjustment component 130.

The data storage system 100 also include simulation component 140. In accordance with one aspect of this disclosure, a developer can configure a level of consistency. As part of the configuration level, acceptable staleness can be specified, for instance with respect to concession prefix, session, or eventual consistency levels. By way of example, a developer may specify that it is acceptable that read operation have a staleness of no more than twenty operations or thirty milliseconds. The simulation component 140 can be employed to enable such a configuration to be ensured by the system in the face of replica failures. More particularly, the simulation component 140 can generate simulated data, as opposed to real client data, by way of various known Monte Carlo techniques. The simulated data can subsequently be employed to determine the state of the data storage system. For instance, an observation can be made that at a given point in time based on operations over simulated data that a network-connection-communication delay is present between a primary and a secondary resulting in a particular amount of staleness as measured in terms of operations or time. If the staleness is within the bounds of acceptable staleness configured by the developer, nothing need be done. If, however, the staleness is greater than the bound acceptable by the developer, the data storage system 100 can be automatically reconfigured to ensure acceptable staleness. In one instance, such automatic reconfiguration can correspond to temporarily raising the level of consistency, for instance from consistent prefix to strong consistency to satisfy a staleness constraint. This need only be temporary because as failed replicas as spun up, or, in other words, come back online, system latency will likely be decreased to a point that enables response within a specified staleness bound.

Furthermore, the data storage system 100 includes monitor component 150 configured to provide real time or substantially real time feedback regarding performance of the data store 120. In other words, a monitoring loop is provided. In this manner, a test workload can be utilized and real time effects of a particular configuration can be communicated.

For example, the monitor component 150 can provide feedback concerning real world execution metrics versus promises based on based on a particular initial configuration and dynamic tuning. Such information can subsequently be utilized to optionally reconfigure the data store 120 based thereon.

Figure 2:
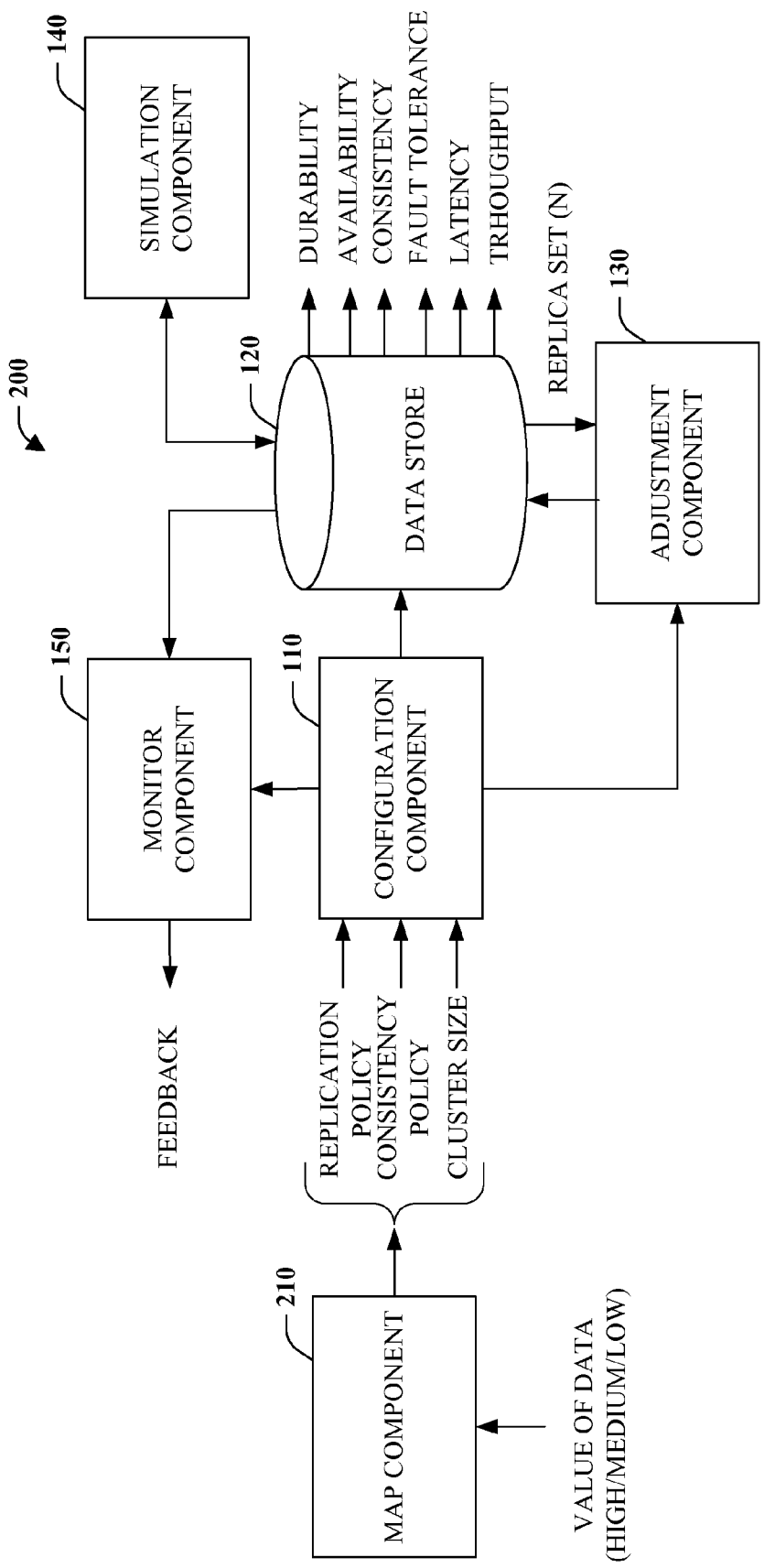
FIG. 2 is a block diagram of a data storage system that accepts value of data configuration.

Rather than driving generation of the data store 120 from policies or more fine-grained values such "N," "W," and "R," for example, the value of data can be utilized. Storage system 200 of FIG. 2, includes the configuration component 110, data store 120, adjustment component 130, simulation component 140, and monitor component 150 as described with respect to the storage system 100 of FIG. 1. Furthermore, the storage system 200 includes map component 210. The map component 210 receives, retrieves, or otherwise obtains or acquires, a value of data and maps it to a particular policies or specific values (e.g., "N," "W," "R") accepted by the configuration component 110.

Here, value of data means valuation of data. For example, data can be one of high value, medium value, and low value. Data can be considered high value if its durability and consistency are crucial. Most ACID (e.g., atomicity, consistency, isolation, durability) databases, which guarantee database transactions are processed reliability as transactions, are geared toward high value data and thus tend to tradeoff availability for consistency in the face of partitions and otherwise tradeoff latency for consistency. On the other hand, if data is low value, availability and latency are crucial at the cost of durability and consistency. Of course, there is a wide range of application workloads that fall between high and low value, and they are termed medium value. In the face of partitions, availability can be traded for consistency and otherwise consistency can be traded for latency for medium value data. Thus, high value data can be mapped to strong level consistency, medium value data can be mapped to consistent prefix or session level consistency, and low value data can be mapped to eventual level consistency. The following table summarizes the above information and provides additional information about how the nature of data can drive configuration and ultimately the nature of the resulting store.

TABLE 5

| How valuable is data? | Consistency Level | $N_{Max}$ | $N_{Min}$ | Write Latency, Availability, and Durability | Read Latency and Availability |
|---|---|---|---|---|---|
| High Value | Strong | 5 | 2 | High | High |
| Medium Value | Consistent Prefix or Session | 3 | 2 | Medium | Medium |
| Low Value | Eventual | 2 | 1 | Low | Low |

Simultaneous failures can happen if nodes share power supplies, switches, cooling units, or racks. To ensure that a given partition remains available during scheduled upgrades and simultaneous node failures, each of the replicas within the replica set can be placed in separate upgrade and fault domains.

Figure 3:
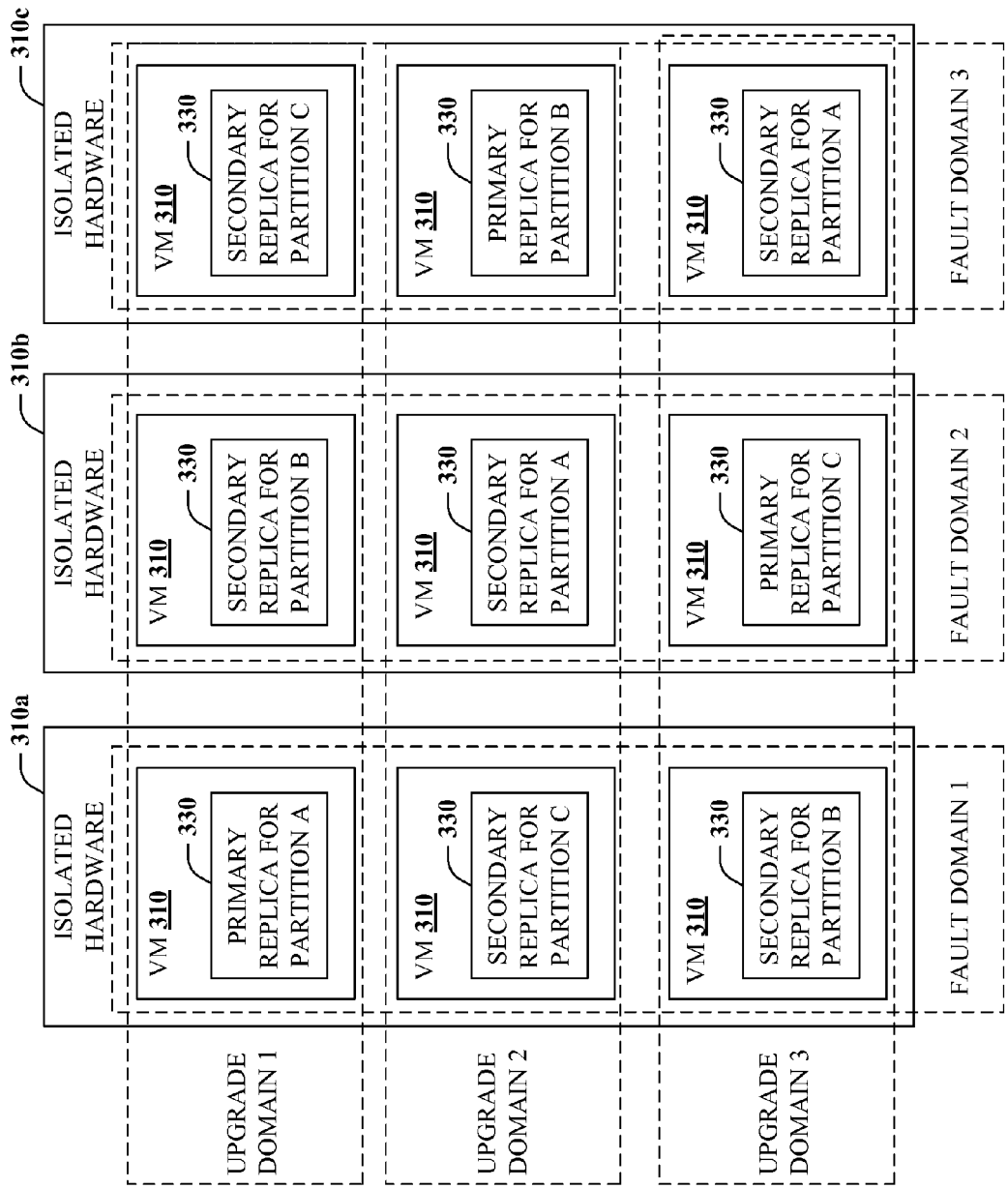
FIG. 3 is a block diagram of replicas distributed across fault and upgrade domains.

FIG. 3 illustrates placement of various compute nodes or replicas across fault and upgrade domains. Here, there are three pieces of isolated hardware 310a-c, which define three corresponding fault domains. In each piece of isolated hardware 310a-c, three virtual machines 320 form three upgrade domains. Primary and secondary replicas are placed in distinct fault domains. In this manner, a secondary replica in one fault domain can become the new primary and start processing write requests should the previous primary become unavailable due to failure in another fault domain. Further, each upgrade domain includes distinct partitions, such that upgrades are node made to more than one replica for the same partition. In other words, replicas corresponding to each partition are placed across fault and upgrade domains to prevent complete quorum loss in the face of failures and node upgrades, respectively.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the simulation component 140 can employ such mechanism to infer effects of different configurations.

Figure 4:
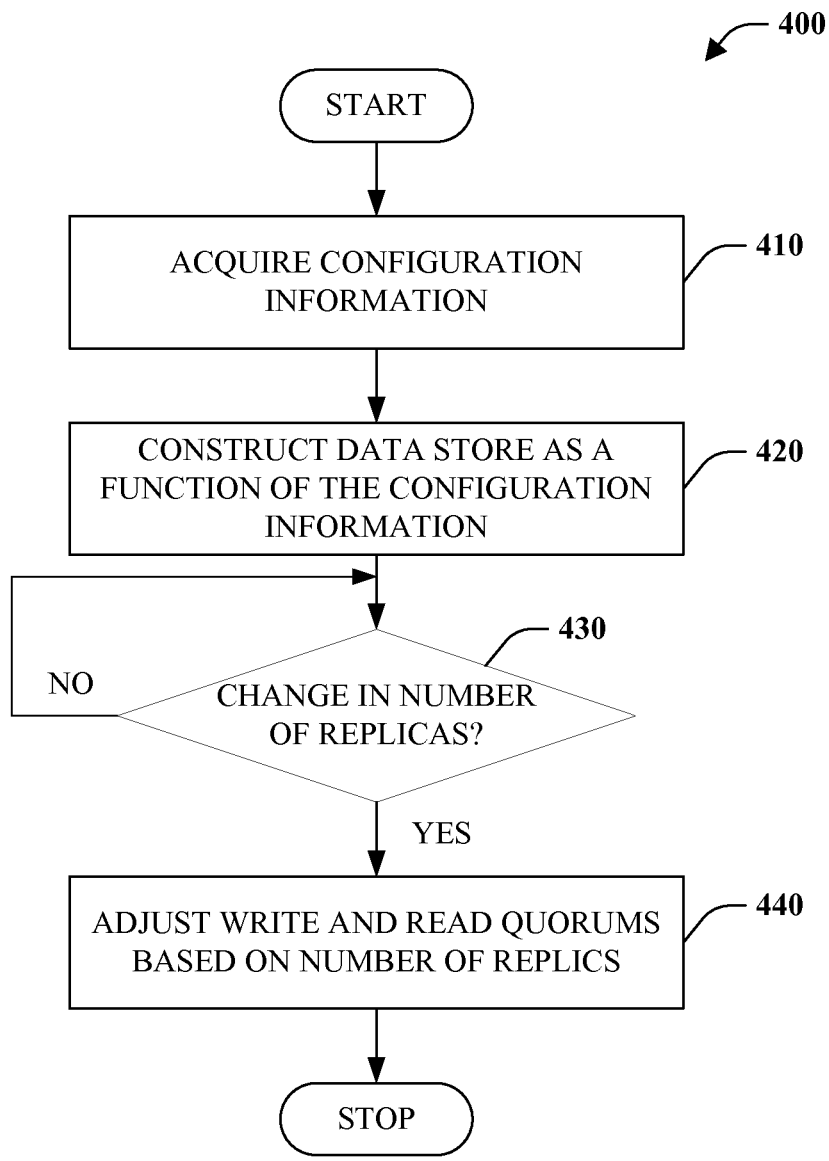
FIG. 4 is a flow chart diagram of method of data store configuration and tuning.
Figure 5:
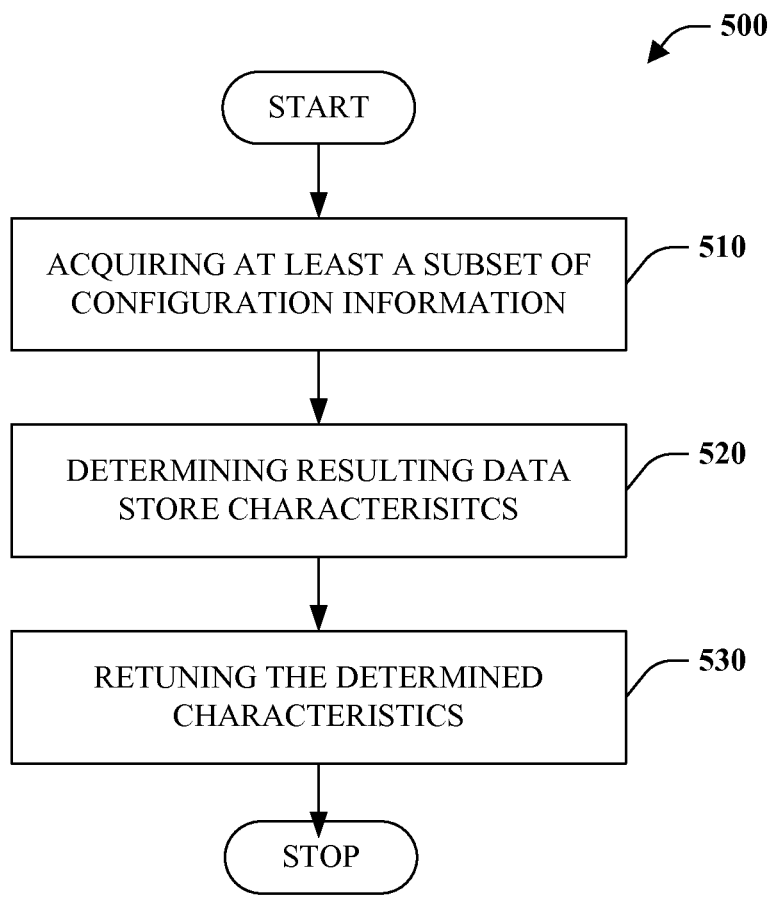
FIG. 5 is a flow chart diagram of a method determining data store tradeoffs.
Figure 6:
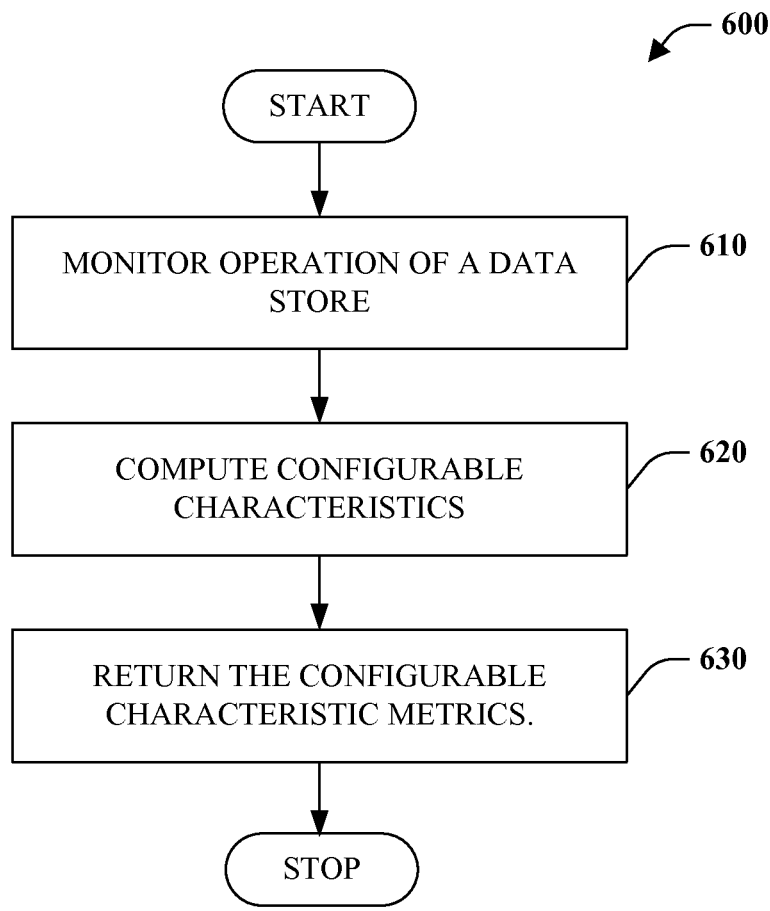
FIG. 6 is a flow char diagram of data source monitoring method.

In view of the exemplary systems described supra, methodologies that may be implemented in accordance with the disclosed subject matter will be better appreciated with reference to the flow charts of FIGS. 4-6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 4, a method 400 of data store configuration and tuning is illustrated. At reference numeral 410, configuration information is received, retrieved, or otherwise obtained or acquired. The configuration information can be provided by an application developer seeking a data storage system that matches requirements of a particular application. Configuration information can be specified with respect to availability and consistency policies, among other things. In this instance, the replication policy can specify are range of replicas or the number of simultaneous failures the system should tolerate for reads and writes respectively. The consistency policy can include identification of at least a consistency level such as strong, consistent prefix, session, or eventual. Alternatively, configuration information can be specified and acquired with respect to the value of data (e.g., high, medium, low). At numeral 420, a data storage system is constructed as a function of the configuration information.

For instance, a number of replicas can be instantiated that implement a replicated state machine to ensure the replicas are mutually consistent based on a directly or indirectly identified level of consistency.

Once a data store constructed, the number of replicas is monitored. At reference numeral 430, a determination is made as to whether there has been a change in the number of replicas as a function of one or more failures reducing the number and regenerations increasing the number. If the number of replicas has not changed ("NO"), the method continues to loop at 430. Alternatively, if a change in the number of replicas is detected ("YES"), the method proceeds to 440 where write and read quorums are adjusted based on the current value of replicas. Stated differently, quorums are automatically, continuously, and dynamically adjusted based on the current number of replicas "N." This allows an availability guarantee to be maintained in view of a range of replica failures at a specified consistency level. In other words, maintaining desired consistency guarantees can be accomplished without having to sacrifice write or read availability despite a range of replica failures as long as the current number of replicas is within a predefined range (e.g., $N_{Min}$-$N_{max}$).

FIG. 5 depicts a method 500 of determining data store tradeoff such as PACELC tradeoffs. At reference numeral 510, at least a subset of data store configuration information is received, retrieved, or otherwise obtained or acquired. At numeral 520, various characteristics of a resulting data store are determined or inferred with some degree of probability. In accordance with one embodiment, various known or novel Monte Carlos techniques can be employed to determine such information. Finally, the determined characteristics can be returned, for example to a requesting party. By way of example, and not limitation, a developer can specify a particular cluster size with partitioning, and a metric indicative or corresponding availability and consistency can be determined and returned. For another cluster size, different results will be returned. As another example, an average document size can be provided with a specific level of consistency, and in response corresponding levels of availability, latency, and/or durability can be returned. This can provide a developer with information to facilitate configuration of a data store prior to actually configuring the store.

FIG. 6 is a flow chart diagram of a method 600 of data source monitoring. At reference numeral 610, operation of a provisioned data store is monitored. At numeral 620, configurable characteristics of the data store are computed and subsequently returned at 630. The configurable characteristics can comprise PACELC tradeoff factors, among other things. For example, the availability, consistency, and latency can be computed with respect to a workload over a data store. The returned results can be compared with configured values to aid in determining whether to alter the configuration. For instance, it may be determined from analysis of the results that in practice less availability is provided than was promised. In any event, the method provides a feedback loop to enable a developer to try different configurations and receive real time or substantially real time response regarding the effects.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
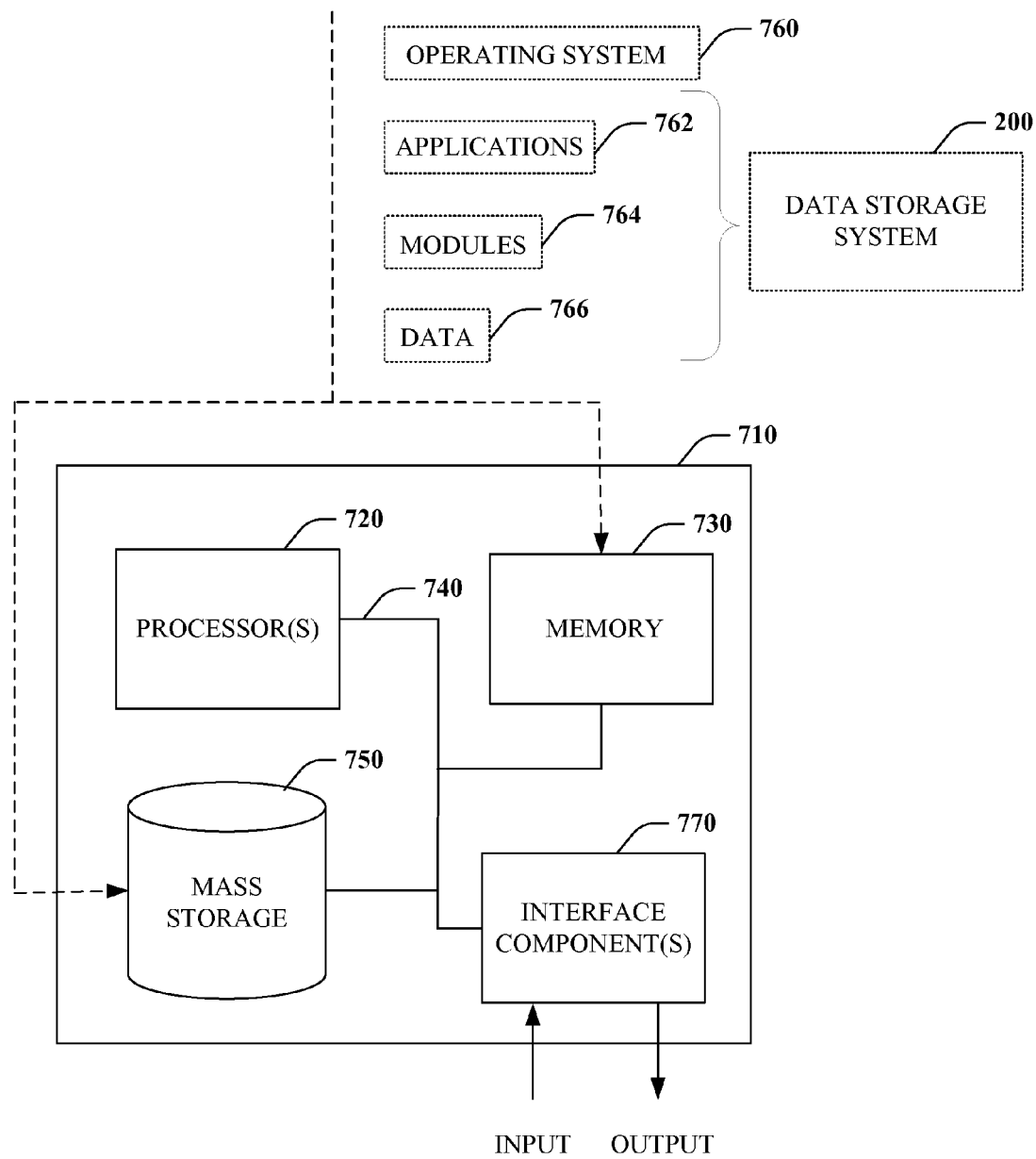
FIG. 7 is a schematic block diagram illustrating a suitable operating environment for aspects of the subject disclosure.

In order to provide a context for the claimed subject matter, FIG. 7 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 7, illustrated is an example general-purpose computer 710 or computing device (e.g., desktop, laptop, tablet, server, hand-held, programmable consumer or industrial electronics, set-top box, game system . . . ). The computer 710 includes one or more processor(s) 720, memory 730, system bus 740, mass storage 750, and one or more interface components 770. The system bus 740 communicatively couples at least the above system components. However, it is to be appreciated that in its simplest form the computer 710 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration.

The computer 710 can include or otherwise interact with a variety of computer-readable media to facilitate control of the computer 710 to implement one or more aspects of the claimed subject matter. The computer-readable media can be any available media that can be accessed by the computer 710 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 710. Furthermore, computer storage media excludes signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 730 and mass storage 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 710, such as during start-up, can be stored in nonvolatile memory, while volatile memory can act as external cache memory to facilitate processing by the processor(s) 720, among other things.

Mass storage 750 includes removable/non-removable, volatile/non-volatile computer storage media for storage of large amounts of data relative to the memory 730. For example, mass storage 750 includes, but is not limited to, one or more devices such as a magnetic or optical disk drive, floppy disk drive, flash memory, solid-state drive, or memory stick.

Memory 730 and mass storage 750 can include, or have stored therein, operating system 760, one or more applications 762, one or more program modules 764, and data 766. The operating system 760 acts to control and allocate resources of the computer 710. Applications 762 include one or both of system and application software and can exploit management of resources by the operating system 760 through program modules 764 and data 766 stored in memory 730 and/or mass storage 750 to perform one or more actions. Accordingly, applications 762 can turn a general-purpose computer 710 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the data storage system 200, or portions thereof, can be, or form part, of an application 762, and include one or more modules 764 and data 766 stored in memory and/or mass storage 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the data storage system 200 and/or associated functionality can be embedded within hardware in a SOC architecture.

The computer 710 also includes one or more interface components 770 that are communicatively coupled to the system bus 740 and facilitate interaction with the computer 710. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 710, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., CRT, LCD, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, implemented at a computer system that includes one or more processors, of data storage system construction and adjustment, the method comprising:
    initiating construction of a distributed data storage system as a function of a replication policy and a consistency policy, wherein the consistency policy comprises a staleness metric;
    monitoring a number of replicas available in the distributed data storage system; and
    automatically adjusting at least one of a write quorum or a read quorum to comply with the consistency policy based at least on changes in the number of replicas available in the data storage system.

2. The method of claim 1, wherein automatically adjusting the at least one write quorum or read quorum comprises adjusting the at least one write quorum or read quorum to comply with a specified availability.

3. The method of claim 1, wherein automatically adjusting the at least one write quorum or read quorum comprises adjusting the at least one write quorum or read quorum to comply with a specified latency.

4. The method of claim 1, wherein automatically adjusting the at least one write quorum or read quorum comprises adjusting the at least one write quorum or read quorum as a function of a minimum number of replicas and a maximum number of replicas.

5. The method of claim 1, further comprising computing the write quorum "W" as "$W =_{ceiling}((N+1)/2)$," where "N" is the current number of replicas.

6. The method of claim 1, further comprising computing the read quorum "R" such that "$R > N-W$," for strong consistency, where "N" is the current number of replicas.

7. The method of claim 1, further comprising computing the read quorum "R" such that "$R = N-W$," for consistent prefix consistency, where "N" is the current number of replicas.

8. The method of claim 1, further comprising computing the read quorum "R" such that "$R = N-W$" and "$W >= R$," for session consistency, where "N" is the current number of replicas.

9. The method of claim 1, further comprising setting the read quorum "R" equal to one for eventual consistency.

10. A computer system, comprising:
    one or more processors; and
    one or more computer-readable media having stored thereon computer-executable instructions that are executable by the one or more processors to cause the computer system to construct and adjust a distributed data storage system, the computer-executable instructions including instructions that are executable by the one or more processors to cause the computer system to perform at least the following:
        initiate construction of a distributed data storage system as a function of a replication policy and a consistency policy, wherein the consistency policy comprises a staleness metric;
        monitor a number of replicas available in the distributed data storage system; and
        automatically adjust at least one of a read quorum or write quorum to satisfy the consistency policy based at least on changes in the number of replicas available in the data storage system.

11. The computer system of claim 10, wherein the consistency policy identifies one of a plurality of consistency levels.

12. The computer system of claim 11, wherein the levels comprise at least one of strong, consistent prefix, session, and eventual.

13. The computer system of claim 10, wherein the replication policy comprises a maximum replica size and a minimum replica size.

14. The computer system of claim 10, wherein the replication policy comprises a fault tolerance metric for write operations.

15. The computer system of claim 10, the computer-executable instructions also including instructions that are executable by the one or more processors to cause the computer system to infer data store characteristics as a function of given information regarding the distributed data storage system.

16. The computer system of claim 10, the computer-executable instructions also including instructions that are executable by the one or more processors to cause the computer system to provide feedback regarding performance of the storage system in substantially real-time.

17. The computer system of claim 10, the computer-executable instructions also including instructions that are executable by the one or more processors to cause the computer system to generate the consistency policy or the replication policy based on one of a plurality of value levels indicative of the nature of data.

18. The computer system of claim 10, the computer-executable instructions also including instructions that are executable by the one or more processors to cause the computer system to map a data valuation of either strong, medium, or low to a configuration.

19. The computer system of claim 10, wherein automatically adjusting the at least one write quorum or read quorum comprises adjusting the at least one write quorum or read quorum to comply with one or more of a specified availability and a specified latency.

20. A computer program product comprising one or more hardware storage devices having stored thereon computer-executable instructions that are executable by one or more processors of a computer system to cause the computer system to construct and adjust a distributed data storage system, the computer-executable instructions including instructions that are executable by the one or more processors to cause the computer system to perform at least the following:
   initiate construction of a distributed data storage system as a function of a replication policy and a consistency policy, wherein the consistency policy comprises a staleness metric;
   monitor a number of replicas available in the distributed data storage system; and
   automatically adjust at least one of a read quorum or write quorum to satisfy the consistency policy based at least on changes in the number of replicas available in the data storage system.

* * * * *